Sept. 27, 1927.  E. J. ARMSTRONG  1,643,598
TRAVELING TRACK SPROCKET
Filed Feb. 13, 1923
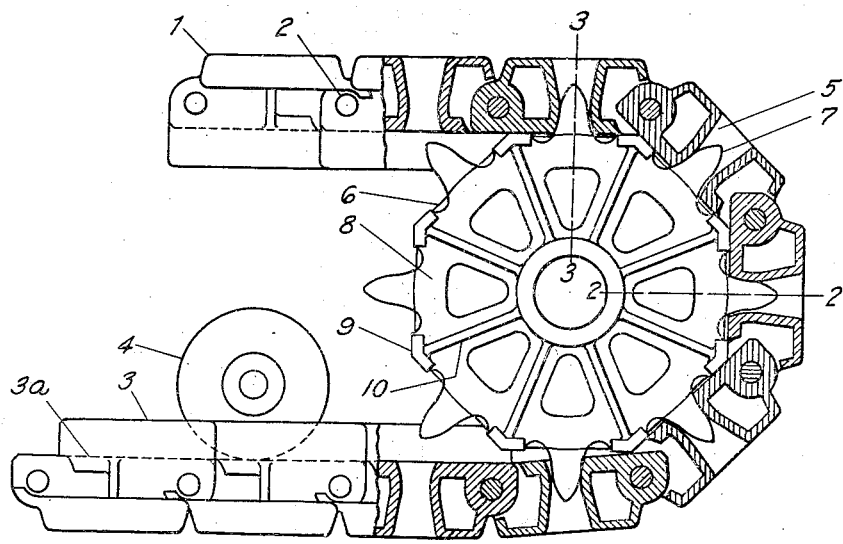
FIG. 1
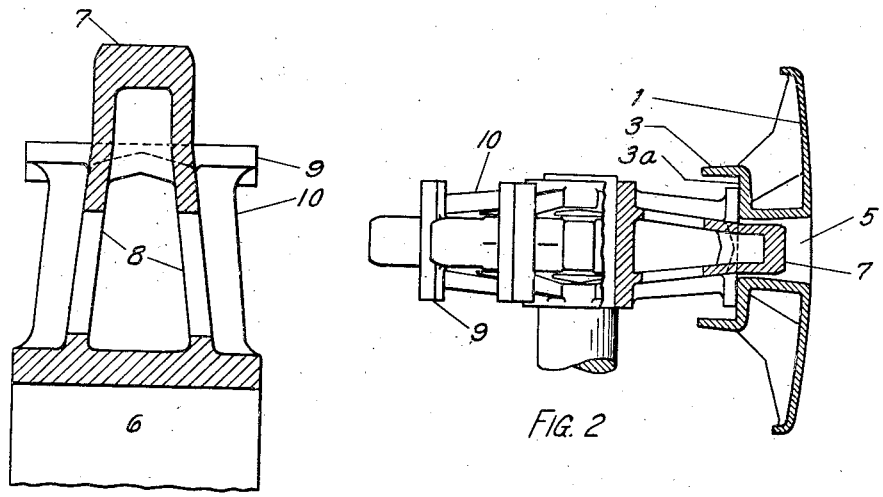
FIG. 3
FIG. 2
Inventor
Edwin J. Armstrong
Attorney Patented Sept. 27, 1927.

1,643,598

UNITED STATES PATENT OFFICE.

EDWIN J. ARMSTRONG, OF ERIE, PENNSYLVANIA, ASSIGNOR, BY MESNE ASSIGNMENTS, TO ERIE STEAM SHOVEL COMPANY, OF ERIE, PENNSYLVANIA, A CORPORATION OF PENNSYLVANIA.

TRAVELING TRACK SPROCKET.

Application filed February 13, 1923. Serial No. 618,818.

This invention is designed to improve the sprockets and traveling track with relation to holding or accumulating dirt. Where the continuous tracks are used in heavy vehicles such as steam shovels there is a tendency for the track to take up more or less earth thus interfering with its efficiency and this earth is held more or less by the track sprockets. In the present invention the track sprocket is formed with a central web and the supporting faces on the web extend laterally from the web but for a short distance circumferentially so that a great portion of the sprocket is open at the periphery at each side of the web. Other features and details of the invention will appear from the specification and claims.

The invention is illustrated in the accompanying drawings as follows:—

Fig. 1 shows a side elevation, partly in section, of a continuous track and sprocket.

Fig. 2 a section on the line 2—2 in Fig. 1.

Fig. 3 an enlarged section of the sprocket on the line 3—3 in Fig. 1.

1 marks the traveling track. This is made up of sections pivotally secured together by pins 2. It has the walls 3 along its sides which tend to protect the surfaces 3ª on which the supporting rollers 4 act. Each section has an opening 5 designed to receive the sprocket teeth.

A sprocket 6 is provided with the teeth 7 operating in the openings 5 and these teeth project from a web 8 preferably a double-walled web as clearly shown in Fig. 3.

At points intermediate the teeth supporting projections 9 extend laterally from the web. These projections have faces at an angle to each other extending front to rear conforming to the alinement of the track sections when flexed in passing around the sprocket. The apex of this angle of the faces is in radial alinement with the axis of the pins 2 so that the track sections are supported on the projections at each end of each track section as it passes around the sprocket. It will readily be seen that this skeleton form of sprocket affords but little lodging space for dirt or mud. I prefer to provide strengthening ribs 10 under each projection 9 as these projections carry the load.

What I claim as new is:—

1. A traveling track sprocket having a supporting web; teeth projecting from and having their sides in alinement with the web; and track supporting projections extending laterally and outwardly from the web.

2. A traveling track sprocket having a supporting web; teeth projecting from and having their sides in alinement with the web; and track supporting projections extending laterally from the web, said projections having faces arranged at an angle to each other from front to rear.

3. In a traveling track apparatus, the combination of a sprocket having a supporting web, teeth projecting from and having their sides in alinement with the web, and track supporting projections extending laterally and outwardly from the web at points between the teeth; and a traveling track on said sprocket each link of which is supported at its ends on said web and projections and having teeth receiving openings intermediate its ends.

4. In a traveling track apparatus, the combination of a sprocket having a supporting web, teeth projecting from and having their sides in alinement with the web, and track supporting projections extending laterally and outwardly from the web at points between the teeth; and a traveling track on said sprocket each link of which is supported at its ends on said web and projections and having teeth receiving openings intermediate its ends, said supporting projections having faces at an angle conforming to the engaging faces of the track sections as they are flexed on the sprocket.

5. In a traveling track apparatus, the combination of a sprocket having a supporting web, teeth projecting from and having their sides in alinement with the web, and track supporting projections extending laterally and outwardly from the web at points between the teeth; and a traveling track on said sprocket each link of which is supported at its ends on said web and projections and having teeth receiving openings intermediate its ends, said supporting projections having faces at an angle conforming to the engaging faces of the track sections as they are flexed on the sprocket, the apex of the angle being in radial alinement with the axes on which the sections swing.

6. A sprocket having a double-walled supporting web; teeth projecting from and with their sides in alinement with the web; and track supporting projections extending laterally and outwardly from the web.

In testimony whereof I have hereunto set my hand.

EDWIN J. ARMSTRONG.